United States Patent [19]

Klint

[11] 3,857,472

[45] Dec. 31, 1974

[54] CONVEYOR FOR ADVANCING AND ORIENTING EGGS AND TRANSFERRING THE EGGS TO GRIPPER UNITS OF AN EGG BREAKING MACHINE

[76] Inventor: Jan Tavsen Klint, No. 33 Havnegade, 5100 Odense, Denmark

[22] Filed: Mar. 23, 1973

[21] Appl. No.: 344,396

[30] Foreign Application Priority Data
Apr. 5, 1972 Denmark............................ 1627/72

[52] U.S. Cl............................ 198/20 R, 198/33 AC
[51] Int. Cl........................ B65g 47/00, B65g 47/24
[58] Field of Search ........ 198/33 R, 33 AA, 33 AC, 198/183, 155, 20

[56] References Cited
UNITED STATES PATENTS
1,663,987   3/1928   Jamieson ............................ 198/183
3,455,356   1/1966   Classen ................................ 99/498
3,475,936   11/1969  Steele ............................. 198/33 AC

Primary Examiner—Richard E. Aegerter
Attorney, Agent, or Firm—Sughrue, Rothwell, Mion, Zinn & Macpeak

[57] ABSTRACT

A conveyor for feeding eggs to gripper units of an egg breaking machine. The conveyor comprises pairs of rollers arranged side by side with their axes parallel to the direction of travel of the active run of the conveyor. Each roller is spool or hourglass shaped so that the two rollers of each pair cooperate to form a seat for supporting an egg and to align and orient the egg during its travel on the conveyor due to a rotation of the rollers about their axes. The rotation may be stopped shortly before the transfer station in which the egg is delivered to a gripper unit by tilting the pair of supporting rollers about a longitudinal axis so that the egg is transferred by a movement which is transverse to the feeding direction and to the major axis of the oriented egg.

10 Claims, 7 Drawing Figures

CONVEYOR FOR ADVANCING AND ORIENTING EGGS AND TRANSFERRING THE EGGS TO GRIPPER UNITS OF AN EGG BREAKING MACHINE

BACKGROUND OF THE INVENTION

The present invention relates to a conveyor for advancing and orienting eggs and transferring the eggs to gripper units of an egg breaking machine, which conveyor comprises an endless flexible carrier element, such as a chain, drive means for moving said carrier element in an endless path including an egg transfer station, a plurality of pairs of spool or hourglass shaped egg supporting rollers, means rotatably mounting said pairs of rollers on said carrier element, and drive means adapted to cause the rollers to rotate on their axes during the travel of the conveyor.

The specification of my prior U.S. Pat. No. 3,542,101, issued Nov. 24, 1970, discloses a machine for mechanically breaking or cracking eggs and comprising gripper or breaking units, which effect a circular movement in a vertical plane whereby each unit successively passes an egg transfer station, an egg breaking station, a dumping station and a shell ejection station. Each unit is composed of two relatively movable parts, and a knife is mounted on each part. The egg is held in the gripper unit by means of clamping forces acting perpendicular to the longer or major axis thereof, and after the shell has been broken by the knives the two shell parts are temporarily held by the knives during dumping of the contents of the egg into a cup located below the gripper unit. In the egg transfer station, which is located at the same level as the axis of rotation of the gripper units, an egg is transferred to a gripper unit from an endless feed conveyor which moves horizontally towards the gripper unit and which comprises rollers which during the travel of the conveyor rotate about their axes which are horizontal and perpendicular to the direction of travel. Each egg is supported in a seat formed by two adjacent rollers, and due to the rotation of the rollers the egg becomes aligned and oriented in such a way that its longer or major axis is parallel to the roller axis and its maximum diameter is located in a predetermined vertical plane parallel to the direction of travel when the egg is being transferred to the gripper unit. This transfer implies a change of about 90° to the direction of movement of the egg, viz. from horizontal to vertical. It has been found that this change of direction may lead to a change of the alignment and orientiation of the egg as effected by the conveyor, before the egg has been securely clamped in the gripper unit which in turn entails the risk that the breaking of the egg does not occur exactly in the central plane of the egg, i.e. the plane normal to the major axis and containing the maximum diameter of the egg. In that case the two halves, in which the egg shell is divided when being broken, are of unequal sizes and in some cases the knives are then unable to hold the shells with sufficient security during the dumping of the egg contents so that one or both shells drop down into the cup together with the egg contents which may be contaminated hereby, or the yolk membrane may be damaged so that the yolk and albumen cannot be separated from each other, the so-called whole eggs or "melanges."

BRIEF STATEMENT OF THE INVENTION

According to the invention there is provided a conveyor for advancing and orienting eggs and transferring the eggs to gripper units of an egg breaking machine, said conveyor comprising an endless flexible carrier element, such as a chain, drive means for moving said carrier element in an endless path including an egg transfer station, a plurality of pairs of spool shaped egg supporting rollers, means rotatably mounting said pairs of rollers on said carrier element so that each roller has its axis of rotation parallel with the direction of travel of the conveyor and the two rollers of each pair are mounted side by side to form in cooperation an egg receiving and supporting seat, drive means for said supporting rollers including a drive roller and stationary means for rotatably supporting said drive roller with its axis parallel to a rectilinear portion of said conveyor upstream of said egg transfer station, and transfer means in the region of said transfer station for imparting to the eggs a movement transversely of the direction of travel of the conveyor and without changing the orientation of the eggs, whereby the eggs are transferred from said supporting rollers to said gripper units.

It has been found in practice that with a conveyor according to the invention the aligning and orientation of an egg, which is effected by the rotation of the supporting rollers during the travel of the egg on the conveyor, is with so to speak 100 percent certainty also maintained during the transfer to a gripper unit until the moment when the grippers close about the egg and from then on holds the egg in a fixed position relative to the knives. It is believed that this advantageous effect is primarily due to the fact that — contrary to the prior art discussed above — the egg is aligned on the rollers in such a way that in the transfer station its major axis points in the direction of travel of the conveyor, and when the breaking machine is constructed so that in the transfer station the path of the gripper units or the tangent to this path is parallel to the conveyor, the transfer of the egg by the transverse movement referred to above does not involve any change in its velocity vector along the major axis or axis of symmetry. This permits a very high throughput of the breaking machine, such as more than five eggs per second, without any risk that during the transfer of an egg to a gripper unit, the egg shows any tendency towards being displaced in its longitudinal direction or tilted or roll about a transverse axis. When the movements of the conveyor and the gripper units are synchronized, the transverse transfer movement may be effected relatively slowly so that the inertia forces associated with that movement may be kept to low values.

It is preferred that the conveyor is driven continuously and that the eggs are transferred one at a time by the transfer means. This ensures at the same time, the gentlest possible transferring operation and the maximum throughput of the machinery, even if it is within the scope of the invention to effect a simultaneous transfer of several eggs, in which case the forwardly directed movements of the conveyor and the gripper units may be temporarily stopped or slowed down prior to the transfer operation, provided that the breaking machine is of the type in which the path of the gripper units has a rectilinear sector, for example, as known from U.S. Pat. No. 3,455,356, issued July 15, 1969, to A. T. Classen.

While the driving and supporting rollers can be constructed so as to transmit the rotary motion by friction, it is preferred that the driving roller is formed as an elongated gear wheel meshing with a gear wheel secured to each of the supporting rollers. In that case liquid, in particular egg white, which leaks out from a damaged egg and penetrates into the roller bearings and solidifies therein, will not be able to stop the rotation of the rollers, since the positive engagement between the gear wheels ensures that the increased torque required for rotating the rollers can be transmitted thereto.

According to a feature of the invention, the driving roller may have its forward or downstream end located upstream of the transfer station. It has been found to be advantageous that when the egg has been properly oriented dur to the rotation of the rollers, it due stationary on the conveyor for a brief period prior to the transferring operation since this reduces the danger of the egg rolling and thus changing its position during the transferring operation.

Each pair of associated supporting rollers may be mounted on a holder connected with the carrier element by means of a pivot pin parallel to the roller axes and the egg transfer means may be adapted to pivot the holder upwardly about the axis of the pivot pin in the transfer station. When the egg thus remains supported by the rollers of the conveyor also during the greater part of the transfer operation, the risk of inadvertent changes in the position of the egg is reduced still further.

The transfer means may comprise a stationary, upwardly inclined guide rail, and a tab may project from each holder so as to engage an upper surface of the guide rail during the travel of the holder past the rail. In order to prevent the holder from pivoting too far up from the carrier element, a second stationary guide rail may extend longitudinally above the guide rail and the tabs projecting from the holders.

Transverse partitions may project from the carrier element between each two successive pairs of egg supporting rollers. Since normally several eggs, e.g. six, will be simultaneously fed to the conveyor from a preceding transverse conveyor, the partitions will ensure that the eggs, irrespective of their orientation at the time when they are delivered onto the conveyor, come to lie with the correct spacing in the direction of advance relative to the supporting rollers so that during their advance to the transfer station, they will actually be aligned and oriented as described above.

Along the sides of the carrier element between an egg depositing station and the transfer station there may be provided stop rails which prevent the eggs from moving sideways away from the seats formed by the egg supporting rollers. Such rails can be useful in view of the risk that the major axis of an egg being deposited upon the conveyor extends askew or transversely of the conveyor, and also because of the sudden starting of the rotation of the egg supporting rollers when they come into driving contact with the continuously rotating driving roller.

The conveyor shown comprises a frame which is shown purely schematically as having a front wall 1 and a rear wall 2 which walls at their upper edges carry guideways 3 and 4 for the topmost horizontal run of an endless conveyor chain. The two guideways may be fabricated of a plastics material having a low friction coefficient. The conveyor chain comprises alternate links 5 and 6, of which links 5 carry holders for the rollers which support the eggs during their advancing to the transfer station, while links 6 are merely connecting links. Each chain link has a cranked lateral portion 5a or 6a, respectively, and the links are connected by means of transversal pins 7 extending through the lateral portions of the links and resting on guideways 3 and 4.

It will be appreciated that in addition to the active upper run shown in the drawings, the conveyor comprises a lower return run, and that the conveyor is tracked over at least two sprockets of which at least one is power driven. Since this is conventional and well-known in the art of conveyor design, it is believed unnecessary to show details thereof.

To the upper surface of each chain link 5 there is secured a forked member 8 having two parallel, rearwardly directed and horizontal limbs 8a and a centre portion 8b fastened to the rearmost edge of the chain link, i.e. the edge nearest to the associated egg breaking machine. A second forked member or holder 9 lies within forked member 8 and is connected thereto by means of a horizontal pivot pin 10 which is journalled in the rear end of limbs 8a and extends parallel to the longitudinal direction of the chain. A spool or hourglass shaped supporting roller 11 is journalled on pivot pin 10, and a gear wheel 12 is secured to the roller 11. A second hourglass shaped supporting roller 13 is journalled on a pivot pin 14 mounted in the limbs 9a of member 9 and extending parallel to pin 10. A gear wheel 12 is secured to roller 13. Rollers 11 and 13 may be constructed as described in Danish Pat. application No. 4,322/71, and in particular the radius of curvature of their central portions may be approximately equal to the radius of curvature in an axial section through the egg, i.e. about 35 to 40 millimetres for hens' eggs. The distance between pins 10 and 14 is such that the two gear wheels 12 clear one another.

Figure 1:
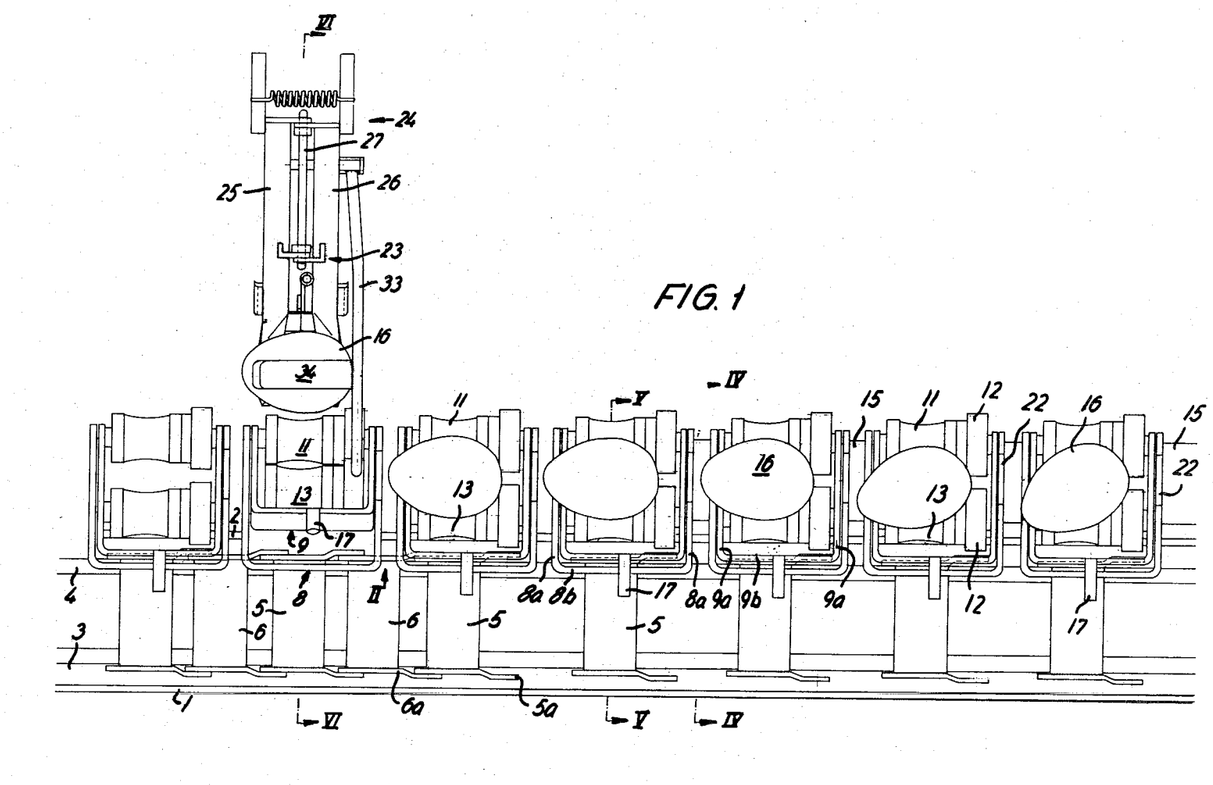
FIG. 1 is a top plan view of that portion of a conveyor embodying the present invention which comprises the transfer station in which eggs are delivered from the conveyor to gripper units of an egg breaking machine.
Figure 3:
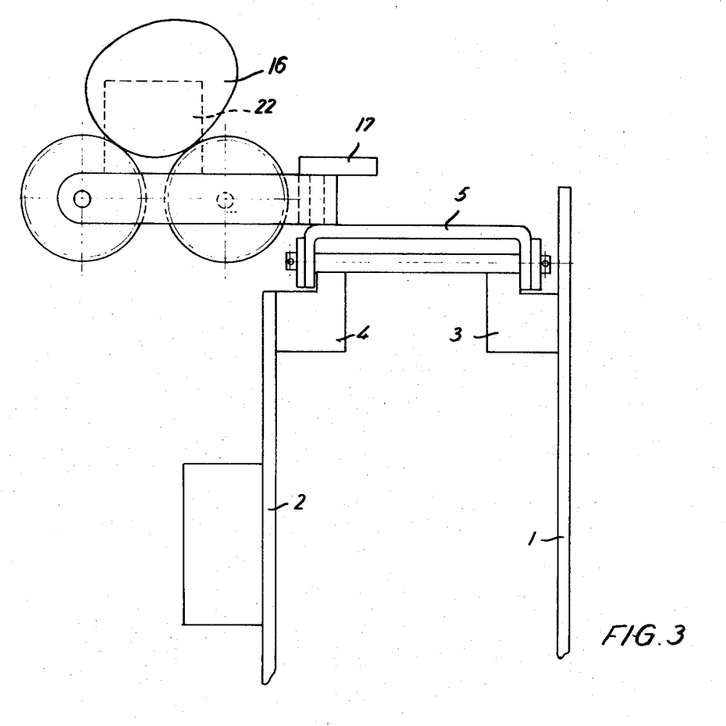
FIG. 3 is a section perpendicular to the direction of advance of the conveyor of a portion of the conveyor which is not shown in FIG. 1 and in which eggs are deposited thereupon.
Figure 4:
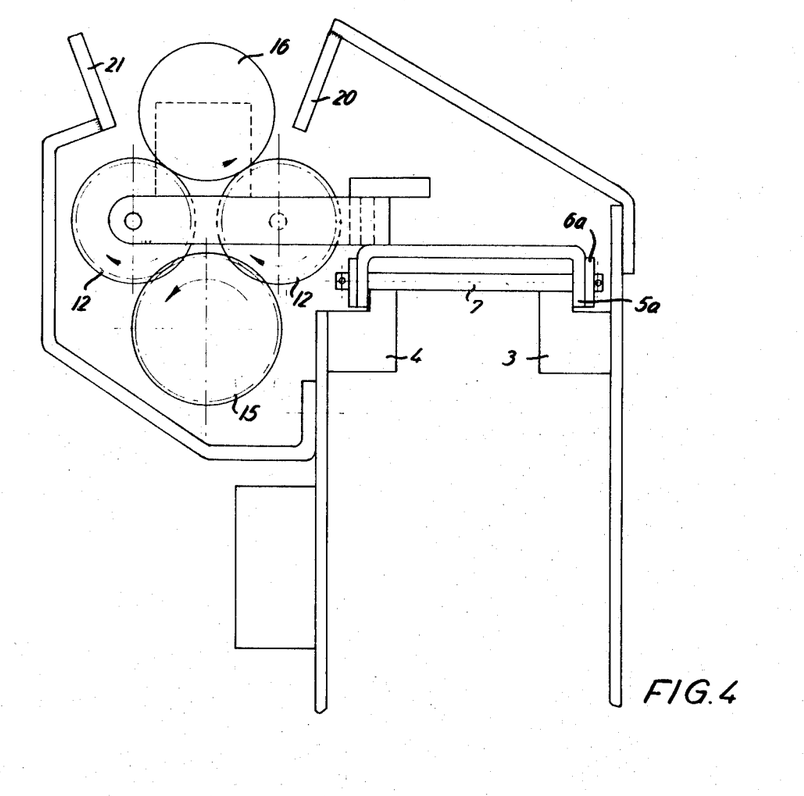
FIG. 4 is a section corresponding to FIG. 3 taken along line IV—IV in FIG. 1.
Figure 5:
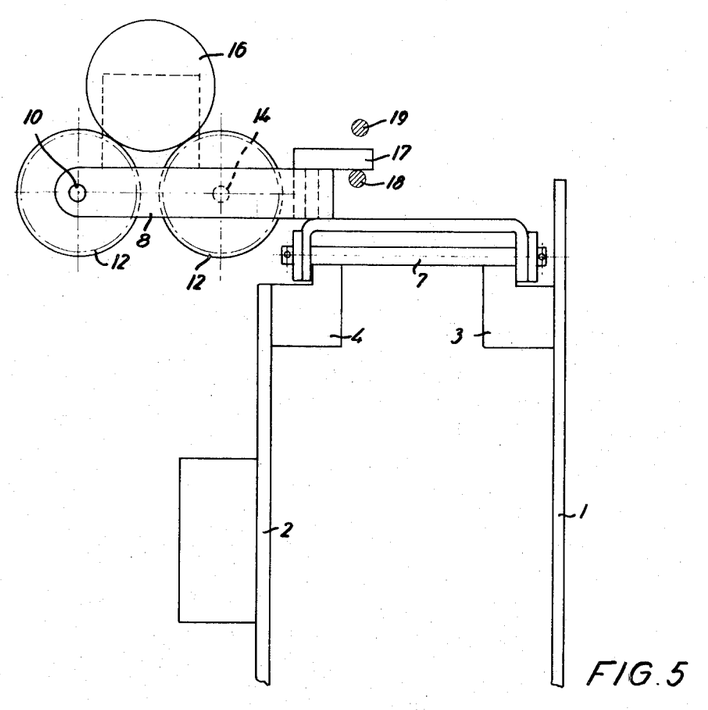
FIG. 5 is a corresponding section taken along line V—V in FIG. 1.

Below a part of the upper horizontal run of the conveyor which is shown in the drawings, an elongated cylindrical gear wheel 15 is journalled in stationary bearings (not shown) and through driving means (not shown), e.g. a chain, gear wheel 15 is coupled to a drive motor for the conveyor and the associated egg breaking machine in such a way that gear wheel 15 rotates in timed relationship with the movement of the gripper or breaking units of the breaking machine. The right-hand end of gear wheel 15 as seen in FIG. 1 is located some distance after or downstream of the station (not shown) where the eggs are deposited upon the conveyor and, as shown in FIG. 1, the opposite end of the gear wheel is located in the region of section line IV-IV, that is to say, some distance before the egg is transferred to a gripper unit. As appears from FIG. 4, the gear wheel 15 meshes with both gear wheels 12 of a holder 9 during the movement of the holder along that portion of the conveyor path in which gear wheel 15 is located, and when gear wheel 15 rotates in the direction shown with an arrow in FIG. 4 it causes both gear wheels 12 and hence the egg supporting rollers 11 and 13 to rotate synchronously in the opposite direction. Irrespective of the orientation of an egg 16 at the time when it is deposited upon two supporting rollers 11 and 13, for instance, even if, as shown in FIG. 3, the egg is oriented transversely of the direction of advance, the action of rotating rollers 11 and 13 will gradually cause the egg to be correctly positioned so that ultimately, as shown in FIG. 4, its longitudinal or major axis is aligned with the direction of advance and its largest diameter or cross-section is located in that vertical plane normal to the direction of advance which contains the smallest diameter of the supporting rollers.

Figure 2:
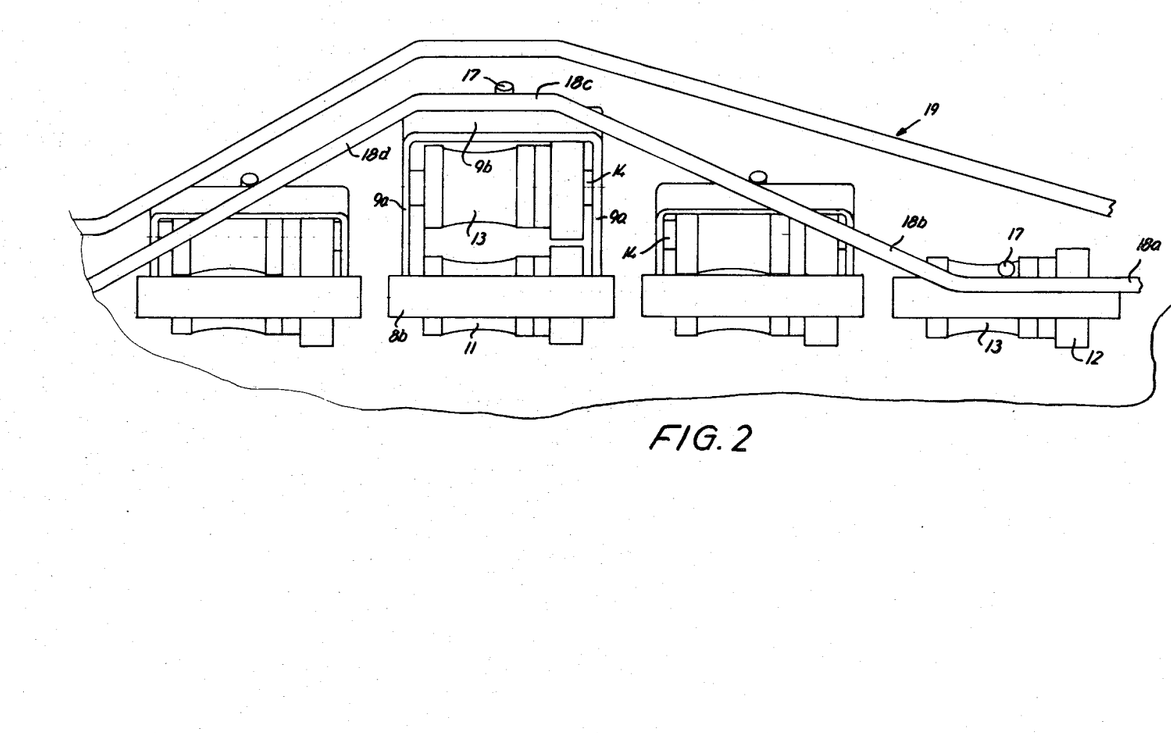
FIG. 2 is a fragmentary view of the conveyor seen in the direction of arrow II in FIG. 1.

The transfer of the aligned and centred egg 16 to a gripper unit is effected by pivoting the entire holder 9 about pivot pin 10. For this purpose a forwardly facing tab or pin 17 is secured to the centre portion 9b of holder 9 and in the transfer station tab 17 interacts with a stationary guide rail 18 which has a horizontal section 18a, see FIG. 2, followed by a sector 18b extending obliquely upwards so as to urge tab 17 and hence holder 9 upwardly until the tab, in the transfer station proper, FIG. 6, moves along a horizontal section 18c of the guide rail. Section 18c is succeeded by an obliquely downwardly directed section 18d, so that when the egg has been transferred to the gripper unit, holder 9 is gradually returned into a horizontal position. For the sake of clarity, guide rail 18 is not shown in FIG. 1.

Above guide rail 18 a longitudinal stop rail 19 is provided to ensure that tab 17 is not lifted so much, due to inertia forces, that holder 9 may tip over completely. Furthermore, along a portion of the horizontal upper path of travel of the conveyor, between the egg depositing station and the transfer station, two oblique stop rails 20 and 21, see FIG. 4, are provided to prevent an egg from moving sideways over the edges of the conveyor during the alignment thereof effected by the rotation of rollers 11 and 13. Rails 19, 20 and 21 are not shown in FIG. 1. An upwardly projecting separator plate 22 is secured to each member 8, see FIGS. 1 and 6, and the partitions are effective to prevent that the eggs, particularly when being deposited onto supporting rollers 11 and 13, come to be incorrectly positioned in the longitudinal direction of the conveyor due to the relatively great distance between successive pairs of rollers 11, 13.

Figure 6:
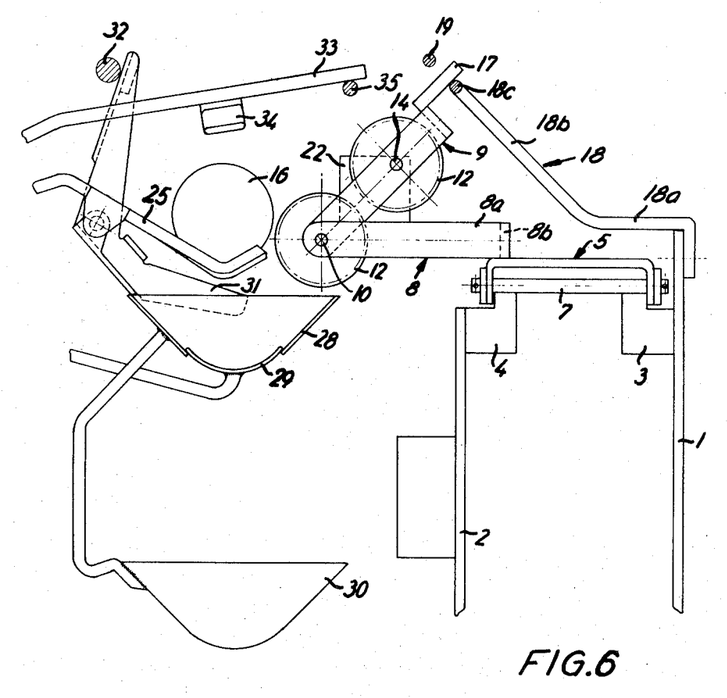
FIG. 6 is a section taken along line VI—VI in FIG. 1, in which also a portion of a breaking unit and of the associated cups for separating yolk and white are shown.
Figure 7:
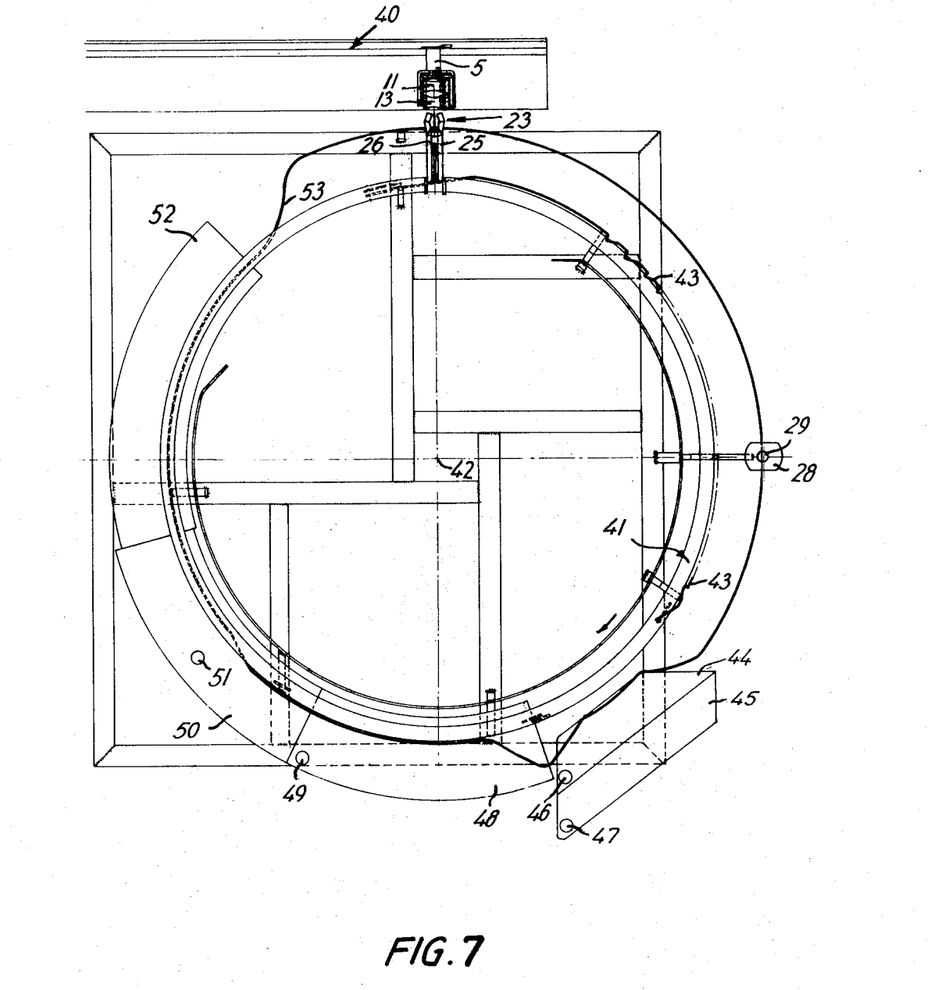
FIG. 7 is a top plan view on a smaller scale showing the egg breaking machine and the discharge end of the conveyor, several details of the machine being omitted for the sake of clarity.

In the transfer station, which is seen in FIG. 6, a gripper unit generally designated by 23, moves forward, i.e. to the left in FIG. 1, in the direction of arrow 24, that is to say, parallel to the direction of advance of the conveyor and synchronously therewith. As shown in FIG. 7 in which the conveyor is designated generally by 40, gripper units 23 with associated separator units may be mounted on a turret 41 which rotates in a horizontal plane about a vertical axis 42, and the gripper units may be spaced along the periphery such that in the transfer station a gripper unit and a holder 9 with an aligned and oriented egg supported by the rollers 11, 13 are located exactly opposite one another. Alternatively, gripper units 23 could be mounted on an endless travelling chain, the path of movement of which has a rectilinear sector in which the egg transfer station is located, such as described in the above-mentioned U.S. Pat. No. 3,455,356. In that case the gripper unit 23 will not move in a circle the tangent of which in the transfer station is parallel to the direction of advance of the conveyor but in a rectilinear movement parallel to the direction of advance. In both cases the synchronization between the movements of the gripper unit and the conveyor is achieved by the aforementioned coupling of the driving means of the egg breaking machine and the conveyor including its drive gear wheel 15.

Since the rotation of gear wheels 12 and hence of supporting rollers 11 and 13, ceases a short distance before the transfer station, the egg 16 does no more rotate on the rollers whose surfaces may be fabricated of rubber or other material possessing relatively high friction, during the above described pivoting of holder 9 about pin 10. As will be understood from FIG. 6, the egg 16 moves from rollers 11 and 13 into the gripper unit in the transfer station along a path at right angles to the axes of the supporting rollers and thus the risk of a change occuring in the orientation of the egg during the transfer operation is very slight.

The gripper unit, which is described in greater detail in Danish Patent application No. 1,625/72, has two mirror-image gripper arms 25 and 26 which, at their foremost ends, are cranked so as to form a seat for the egg 16 and the arms are preferably formed such that the egg is theoretically supported at four points. The two arms 25 and 26 may pivot relative to one another about a radial, horizontal shaft 27 in such a way that, following the subsequent cracking or breaking of the egg, the arms may swing away from each other so that the contents of the egg may be dumped into a separating unit fitted below the gripper unit. The separating unit comprises an upper cup 28, the bottom of which is constituted of a separate yolk receiving cup 29 which may be reciprocated vertically, and a lower cup 30 for receiving the egg white. The breaking of the egg is effected by means of two knives 31 each of which is connected to an arm 25 or 26 and which are actuated by means of a stationary cam rail 32 in the breaking machine. During the breaking operation, the egg is held from above by an arm 33 carrying a heavy weight 34 having a downwardly convex surface which, from above, bears against the egg 16. In the transfer station, arm 33 with weight 34 is kept raised by means of a stationary cam rail 35 which forms part of the breaking machine and which ensures that the egg is able to move unimpededly onto arms 25 and 26.

Following the previously mentioned breaking of the egg in the gripper or breaking unit 23 by means of knives 31, arms 25 and 26 are, as mentioned, swung away from one another and, when the contents of the egg are emptied into cup 28 of the subjacent separating unit, knives 31 are to cooperate with the two arms and counterweight 34 to hold the eggshells until these are removed in a subsequent shell ejection station. It is of great value, therefore, that the centering and orientation of the egg described above prior to its transfer to the gripper unit and the retention of the position of the egg during the transfer operation ensures that the eggshell is broken at its largest diameter since the two parts of the eggshell are then held in a considerably more reliable way than if the breaking occurred in a more or less oblique direction or in a plane offset from the largest diameter of the egg.

In addition to the details of the egg breaking machine already mentioned, FIG. 7 shows a stationary cam rail 43, which during the passage of a gripper unit lifts and lowers the separator cup 29 several times so that the yolk and egg white are separated, and three successive stations for dumping the contents of the separator cups 29 and 30. The first dumping station, as seen in the direction of rotation of turret 41, is for normally separated eggs and comprises receiving trays or chutes 44 and 45 for the egg white and yolk, respectively, which are dumped from the respective cups 30 and 29 when the separating unit is swung downwardly from the position shown in FIG. 6. In the bottom of each chute there is an opening 46 and 47, respectively, and suitable receptacles for separately collecting the egg white and yolk may be placed below the openings.

The next dumping station is for whole eggs in which the yolk and egg white have been intermingled, and this station comprises a single receiving chute 48 with a bottom opening 49. The final station may be for collecting socalled blood eggs and comprises a receiving chute 50 with a bottom opening 51. After chute 50 there is provided a diagrammatically shown washing section 52 in which those separator cups, which have been swung down in one of the two last dumping stations, are washed before they are returned to the position shown in FIG. 6. The lifting is effected by means of a cam rail 53, which directly engages the lower separator cup 30. When the rail 53 extends along the entire circumference of the machine, it may further be effective to ensure that in the section following the transfer station the separator unit does not swing down unintentionally before the first dumping station.

What I claim is:

1. A conveyor for advancing and orienting eggs and transferring the eggs to gripper units of an egg breaking machine, said conveyor comprising
   an endless flexible carrier element, such as a chain,
   drive means for moving said carrier element in an endless path including an egg transfer station,
   a plurality of pairs of spool shaped egg supporting rollers,
   means rotatably mounting said pairs of rollers on said carrier element so that each roller has its axis of rotation parallel with the direction of travel of the conveyor, and the two rollers of each pair are mounted side by side to form in cooperation an egg receiving and supporting seat,
   drive means for synchronously driving both rollers of each roller pair in the same direction including a drive roller and stationary means for rotatably supporting said drive roller with its axis parallel to a rectilinear portion of said conveyor upstream of said egg transfer station,
   and transfer means in the region of said transfer station for imparting to the eggs a movement transversely of the direction of travel of the conveyor and without changing the orientation of the eggs, whereby the eggs are transferred from said supporting rollers to said gripper units.

2. A conveyor as claimed in claim 1, wherein said conveyor drive means is adapted to move said conveyor continuously, and said transfer means are adapted to transfer one egg at a time from a pair of supporting rollers to a gripper unit.

3. A conveyor as claimed in claim 1, wherein a gear wheel is rigidly secured to each supporting roller, and said drive roller is an enlongated gear wheel located so as to mesh with said first mentioned gear wheels.

4. A conveyor as claimed in claim 1 wherein the downstream end of said drive roller is located upstream of said egg transfer station.

5. A conveyor as claimed in claim 1, wherein said means mounting said supporting rollers on said conveyor comprises — for each pair of rollers — a holder and a pivot pin connecting said holder with said carrier element and having its axis parallel to the axes of the supporting rollers journalled in said holder, and wherein said egg transfer means comprises means for pivoting each holder upwardly about the axis of the associated pivot pin.

6. A conveyor as claimed in claim 5, wherein said pivot pin is coaxial with one of said egg supporting rollers.

7. A conveyor as claimed in claim 5, wherein said egg transfer means comprises a stationary, upwardly inclined guide rail, and a tab is secured to each of said holders and projects therefrom so as to engage en upper surface of said guide rail during the travel of said holder past said rail.

8. A conveyor as claimed in claim 7, further comprising a second stationary rail extending longitudinally above said guide rail and the path of said tabs.

9. A conveyor as claimed in claim 1, further comprising a plurality of transverse partitions mounted in and protruding from said carrier element with one partition located between each two successive pairs of egg supporting rollers.

10. A conveyor as claimed in claim 1, further comprising stop rails stationarily mounted along the side of said carrier element intermediate an egg depositing station and said egg transfer station for preventing eggs from moving sideways away from their seats formed by said egg supporting rollers.

* * * * *